United States Patent
Mehrabian et al.

(10) Patent No.: US 11,704,550 B2
(45) Date of Patent: Jul. 18, 2023

(54) OPTICAL CONVOLUTIONAL NEURAL NETWORK ACCELERATOR

(71) Applicant: The George Washington University, Washington, DC (US)

(72) Inventors: Armin Mehrabian, Arlington, VA (US); Volker J. Sorger, Alexandria, VA (US); Tarek El-Ghazawi, Vienna, VA (US); Mario Miscuglio, Silver Spring, MD (US)

(73) Assignee: The George Washington University, Washington, DC (US)

(*) Notice: Subject to any disclaimer, the term of this patent is extended or adjusted under 35 U.S.C. 154(b) by 0 days.

(21) Appl. No.: 17/589,321

(22) Filed: Jan. 31, 2022

(65) Prior Publication Data

US 2022/0156571 A1    May 19, 2022

Related U.S. Application Data

(63) Continuation of application No. 16/507,854, filed on Jul. 10, 2019, now Pat. No. 11,238,336.

(60) Provisional application No. 62/696,104, filed on Jul. 10, 2018.

(51) Int. Cl.
*G06N 3/067* (2006.01)
*G06F 1/06* (2006.01)

(52) U.S. Cl.
CPC ............ *G06N 3/0675* (2013.01); *G06F 1/06* (2013.01)

(58) Field of Classification Search
CPC ................................ G06F 1/06; G06N 3/0675
USPC ........................................................... 706/40
See application file for complete search history.

(56) References Cited

U.S. PATENT DOCUMENTS

| | | | |
|---|---|---|---|
| 6,625,629 B1 | 9/2003 | Garcia | |
| 11,238,336 B2 * | 2/2022 | Mehrabian | .......... G06N 3/0454 |
| 2004/0158459 A1 | 8/2004 | Grigoryan | |
| 2019/0370652 A1 | 12/2019 | Shen | |
| 2020/0110992 A1 | 4/2020 | Hosseinzadeh | |
| 2021/0201126 A1 | 7/2021 | Meng | |

OTHER PUBLICATIONS

A. Krizhevsky et al., "ImageNet Classification with Deep Convolutional Neural Networks," 9 pgs., Dec. 31, 2012.

* cited by examiner

*Primary Examiner* — Tomi Skibinski
(74) *Attorney, Agent, or Firm* — Blank Rome LLP

(57) ABSTRACT

An accelerator for modern convolutional neural networks applies the Winograd filtering algorithm in a wavelength division multiplexing integrated photonics circuit modulated by a memristor-based analog memory unit.

11 Claims, 9 Drawing Sheets

OPTICAL CONVOLUTIONAL NEURAL NETWORK ACCELERATOR

CROSS-REFERENCE TO RELATED APPLICATIONS

This application is a continuation of U.S. application Ser. No. 16/507,854, filed July 10. 2019, which claims priority benefit of U.S. Provisional Application No. 62/696,104, entitled, Optical Convolutional Neural Network Accelerator, which was filed on Jul. 10, 2018, and which is each of which are entirely incorporated by reference herein.

TECHNICAL FIELD

This disclosure relates generally to photonic circuits and relates particularly to systems and methods of accelerating the computations performed by convolutional neural networks.

BACKGROUND

The field of artificial intelligence (AI) has undergone revolutionary progress over the past decade. Wide availability of data and cheaper-than-ever compute resources have contributed immensely to this growth. In parallel, advancements in the field of modern neural networks, known as deep learning have attracted the attention of academia and industry due to their success across a variety of AI applications including, but not limited to, computer vision, speech recognition, and natural language processing. Among the different types of AI tools, neural networks are considered as having the most viable architecture. This standing is due in no small part to neural networks' versatility in performing AI tasks. The tasks neural networks are expected to perform are extremely complex and computationally intensive. Attempts to effectively satisfy the high computational overhead of such tasks have not been wholly satisfactory. Thus, there is room for improvement in the art.

BRIEF DESCRIPTION OF THE DRAWINGS

For illustration, there are shown in the drawings certain examples described in the present disclosure. The full scope of the inventions disclosed herein are not limited to the precise arrangements, dimensions, and instruments shown. In the drawings.

DETAILED DESCRIPTION

Figure 1:
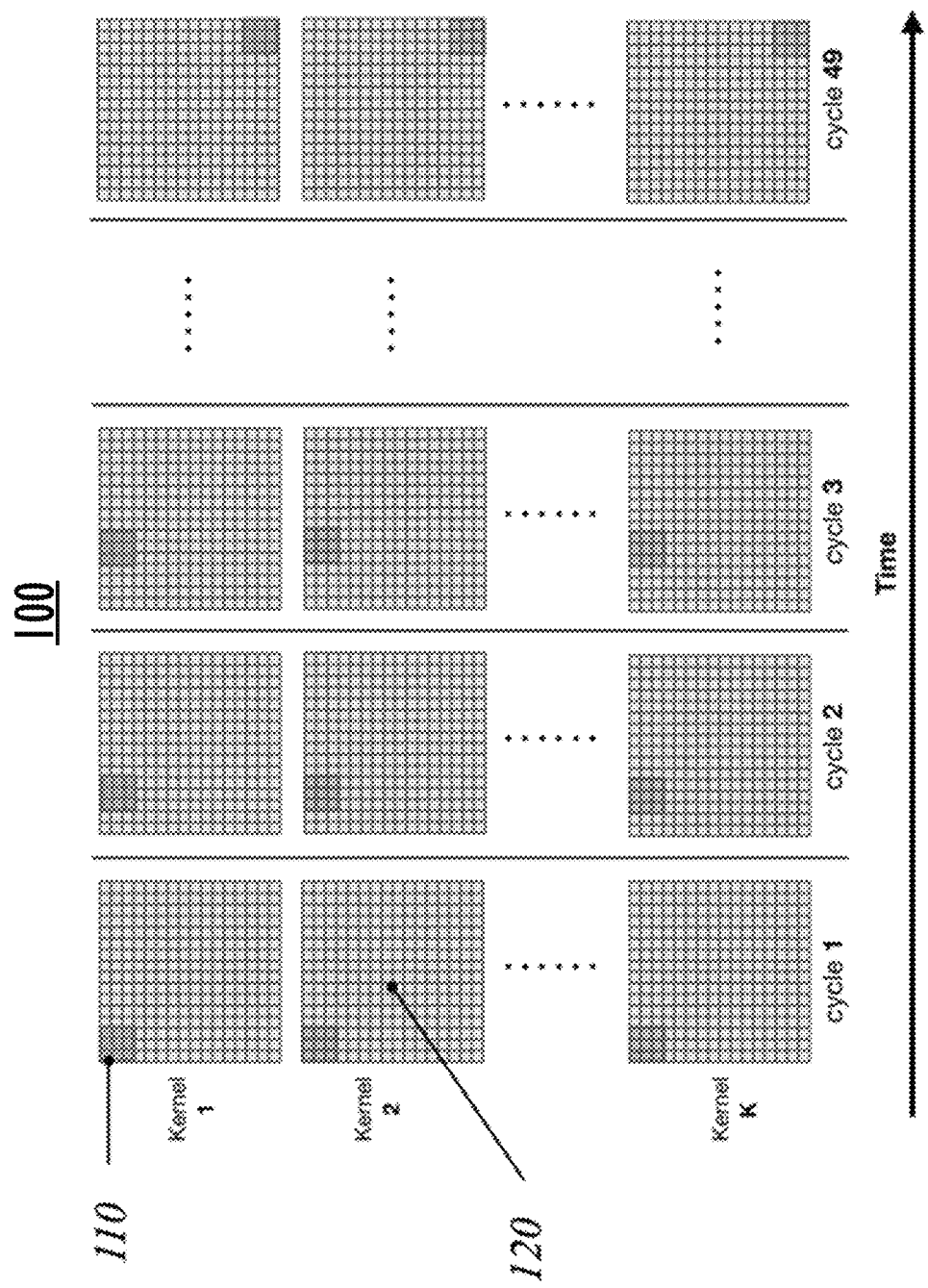
FIG. 1 illustrates aspects of a method of processing a collection of kernels in a parallel fashion, in accordance with an example of this disclosure.

In the drawings and in the descriptions of the drawings, certain terminology is used for convenience only and is not to be taken as limiting the examples of the present disclosure. Throughout the drawings and the description, like numerals indicate like elements.

Introduction

Artificial neural networks or connectionist systems are computing systems that are inspired by the biological neural networks that constitute animal brains. Such systems "learn" to perform tasks by considering examples, usually without being programmed with any task-specific rules. A convolutional neural network (CNN) is a type of artificial neural network, useful for analyzing visual imagery.

A system's response to any input signal can be expressed as an integral involving only the input signal and the system's impulse response function. The interaction between the input signal and the input response function is called convolution. For a linear time-invariant system, the system's total response to a sum of inputs is the sum of the responses to each individual input. If the input is a sum of weighted impulses, then the output signal is also a sum of weighted impulses.

Deep learning is a class of machine learning algorithms that use multiple layers to progressively extract higher level features from raw input. For example, in image processing, lower layers may identify edges, while higher layers may identify human-meaningful items such as digits/letters or faces.

The Winograd filtering algorithm (or simply the Winograd algorithm or the Winograd Transform) is a mathematical transform which factorizes $z^{N-1}$ into cyclotomic polynomials. Cyclotomic polynomials often have coefficients of 1 (one), 0 (zero), or −1 (negative one), and therefore require few (if any) multiplications. The Winograd algorithm can be used to obtain minimal-multiplication for convolution operations. Winograd filtering is a mathematical technique that allows for performing a convolution operation using a reduced number of multiplication operations.

Wavelength-division multiplexing (WDM) is a technology which multiplexes a plurality of optical carrier signals onto a single optical fiber by using different wavelengths (i.e., colors) of laser light. WDM enables bidirectional communications over one strand of fiber, as well as multiplication of capacity.

An electro-optic modulator (EOM) is an optical device in which a signal-controlled element exhibiting an electro-optic effect is used to modulate a beam of light.

Discussion

At least one example of this disclosure includes an electro-optics framework for accelerating CNNs. In accordance with an example of this disclosure, a high-speed, low-power photonic network uses a Winograd filtering algorithm to perform convolution to speed up execution time of a photonic network. In an example, a low-power photonic network uses a Winograd filtering algorithm to reduce the computational complexity of computations of the photonic network. At least one example of this disclosure exploits coherent all-optical matrix multiplication in WDM, using one or more mirroring weight banks. In accordance with an example of this disclosure, a neural network includes one or more electro-optics circuits in one or more photonics-integrated circuits in combination with one or more integrated memory blocks, which perform weighting functions and minimize static power consumption of the neural network. At least one example of this disclosure includes a CNN accelerator. A CNN includes a Winograd filtering circuit which is configured to apply a Winograd filtering algorithm, a photonic integrated wavelength division multiplexer configured to perform wavelength division multiplexing. At least one example of this disclosure includes a memristor-based analog memory circuit.

In accordance with this disclosure, a neural network implements neuron functionalities through the use of integrated photonics. Technical benefits of using integrated photonics for neuron functions include reduced power consumption and increased operating speed over primarily electronic networks lacking integrated photonics.

At least one example of this disclosure includes a photonic integrated circuit. Electromagnetic waves are coherent and interfere (in a coherent manner) when propagating through the photonic integrated circuit, mimicking the multiply and accumulate (MAC) functions of digital electronic processors. In at least one example of this disclosure, a photonic integrated circuit draws upon the coherent nature of electromagnetic waves to perform one or more AI operations. In at least one example of this disclosure, a photonic integrated circuit benefits from the coherent nature of electromagnetic waves to implement one or more algorithms.

At least one technical advantage of one or more photonic integrated circuits of this disclosure is that the one or more photonic integrated circuits consume much less power to perform a given task (e.g., acting as a neuron in a neural network) than would a corresponding (purely) electronic integrated circuit. In accordance with an example of this disclosure, a photonic integrated circuit can include an optical neural network. In at least one example, a photonic integrated circuit comprises an accelerator for an optical neural network, such as a CNN. In accordance with an example of this disclosure however, a trained photonic neural network does not consume energy to perform active switching functions. In accordance with this disclosure, in a photonic neural network weighting is performed passively, thereby enabling the photonic neural network to execute many computations without consuming dynamic power.

In accordance with an example of this disclosure, a CNN is comprised of one or more convolutional layers. Each convolution layer is comprised of many filters 110 that scan input data for a presence or absence of a particular set of features, in accordance with an example of this disclosure. Inputs to convolutional layers and outputs from convolutional layers can be referred to as feature maps. In at least one example, a feature map which is output from a first convolutional layer can be received as input by one or more second convolutional layers. In one or more examples of this disclosure, multiple convolutional layers are cascaded. At least one example of this disclosure includes a hierarchy of feature detectors comprising many cascaded convolutional layers. In at least one example of this disclosure, feature detectors which are closer to a feature map received by a CNN are configured to detect primitive features of the input data, and with passage to each cascaded layer, the features detected become more abstract. Hence, the feature maps of each successive convolutional layer are more abstract than the feature map of the immediately preceding convolutional layer. In at least one CNN of this disclosure, the filters 110 are three-dimensional, with the first two dimensions being height h and width w. In at least one example, the third dimension is the filter's channel c. The channel dimension c is representative of multiple various filters 110.

In at least one CNN of this disclosure, the values of convolutional filters 110 are learned through training the CNN. The operational characteristics of the convolutional layers are thus imprinted through deep learning, rather than through coding or human engineering. At least one technical benefit of a CNN in which weights are learned rather than programmed, is that a given CNN schema can be trained to perform different kinds of tasks, thereby avoiding the need for each CNN with the given schema to be programmed according to the specific tasks that the individual CNN will be called upon to perform. At least one advantage of configuring a CNN of this disclosure through training, rather than through design, is that configuration through training reduces the influence of designer bias.

At least one example of this disclosure pertains to a neuromorphic system in which processing elements are arranged in a distributed fashion with a great quantity of incoming connections and a great quantity of outgoing connections. Such processing elements can also be termed neurons. Thus, one or more of the CNNs to which this disclosure pertains contain many neurons with multiple incoming and outgoing connections. In accordance with an example of this disclosure, a neuromorphic processing element is a purpose-specific processor. At least one technical benefit associated with the purpose-specific processor is that the purpose-specific processor will perform a specific operation more quickly than would a general-purpose processor, such as a central processing unit.

At least one example of this disclosure includes an accelerator for a photonically-based neuromorphic CNN. Many processing elements of the CNN accelerator are photonically interconnected. The photonic interconnections avoid the energy dissipation associated with charging and discharging of electrical wires. In one or more CNNs to which this disclosure relates, a large proportion of tasks are based mainly on MAC operations. Photonic elements of one or more CNNs require much less energy to perform MAC functions than do their electronic counterparts, in accordance with this disclosure. At least one CNN accelerator of this disclosure includes at least one wavelength-division multiplexer which performs WDM. The photonic nature of the CNN accelerator enables the CNN accelerator to leverage WDM to communicate more quickly and perform more computations than would be possible in the absence of WDM. In at least one CNN with which this disclosure is concerned, application of WDM promotes channel density within a CNN. Increased channel density increases computational parallelism for a CNN. A WDM photonic CNN can perform MAC functions while consuming near-zero amounts of energy, in accordance with this disclosure.

FIG. 1 illustrates aspects of a method 100 of processing a collection of kernels 110, in accordance with an example of this disclosure. According to method 100, the collection of kernels 110 are processed simultaneously on a single input 120. Each input 120 is assigned to a distinct wavelength of light.

Figure 2:
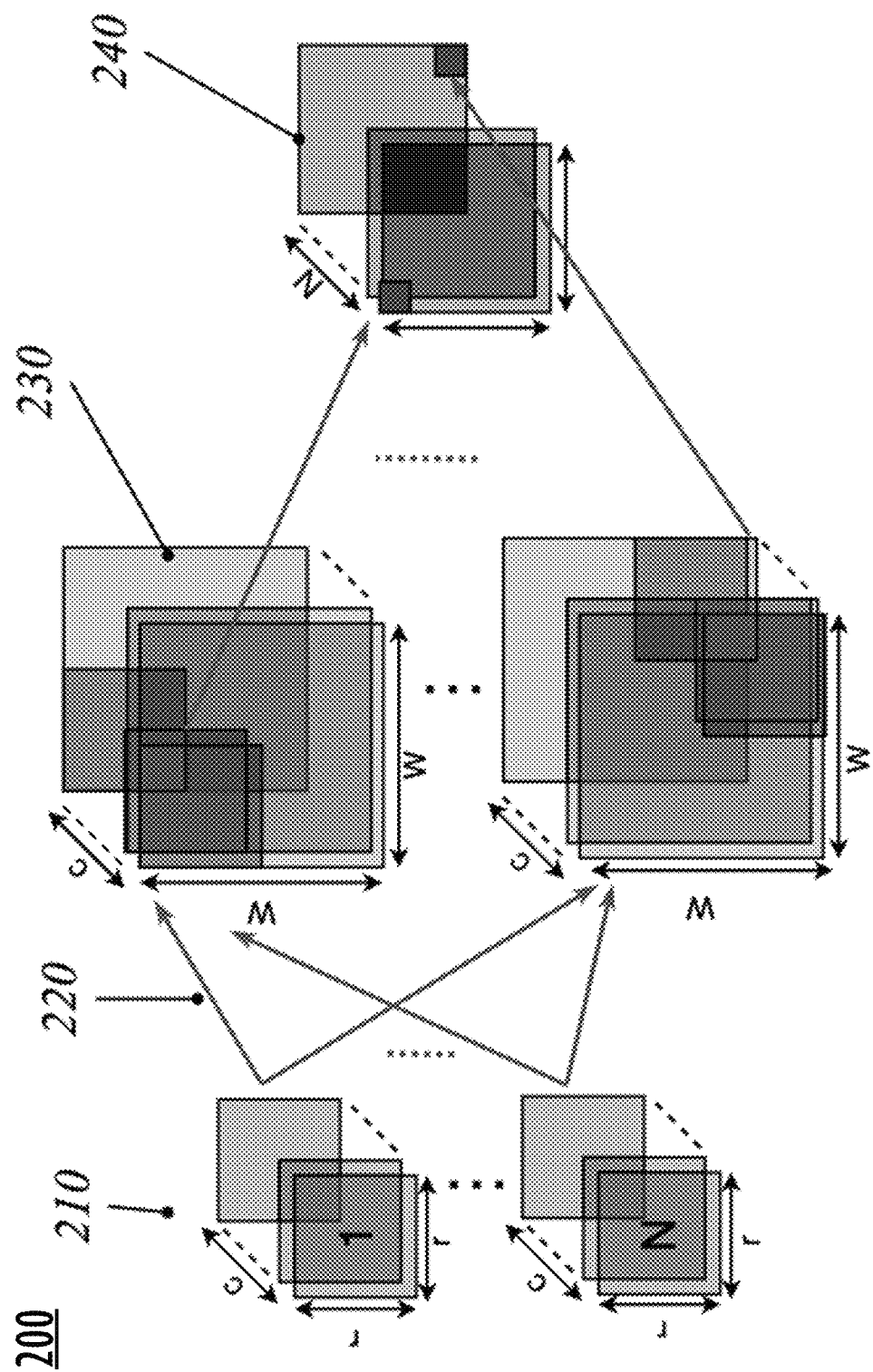
FIG. 2 illustrates a layer of a convolutional neural network, in accordance with an example of this disclosure.

FIG. 2 illustrates a CNN layer 200. In CNN layer 200, a set of trained kernels 210 (e.g., 110) is connected by connections 220. The kernels 210 operate on inputs 230 (e.g., 120). Operating on the inputs 230 by the kernels 210 produces output 240. In at least one CNN, using N wavelengths of light, it is possible to establish up to $N^2$ independent connections, in accordance with this disclosure. The number of independent connections which are possible enable a CNN to operate on much larger datasets than non-photonic neural networks. The connections in a CNN between local input regions and filters 210 (e.g., 110) are sparse, in accordance with an example of this disclosure. In at least one example, smaller filters 210 are favored over larger filters because smaller filters 210 are better suited for detecting finer local patterns. Larger and more global patterns are usually detected at later layers 200 of CNNs because larger and more global patterns tend to be abstract, in accordance with this disclosure. The patterns which are detected by later layers 200 are based on the less abstract patterns detected in earlier layers 200.

Figure 3:
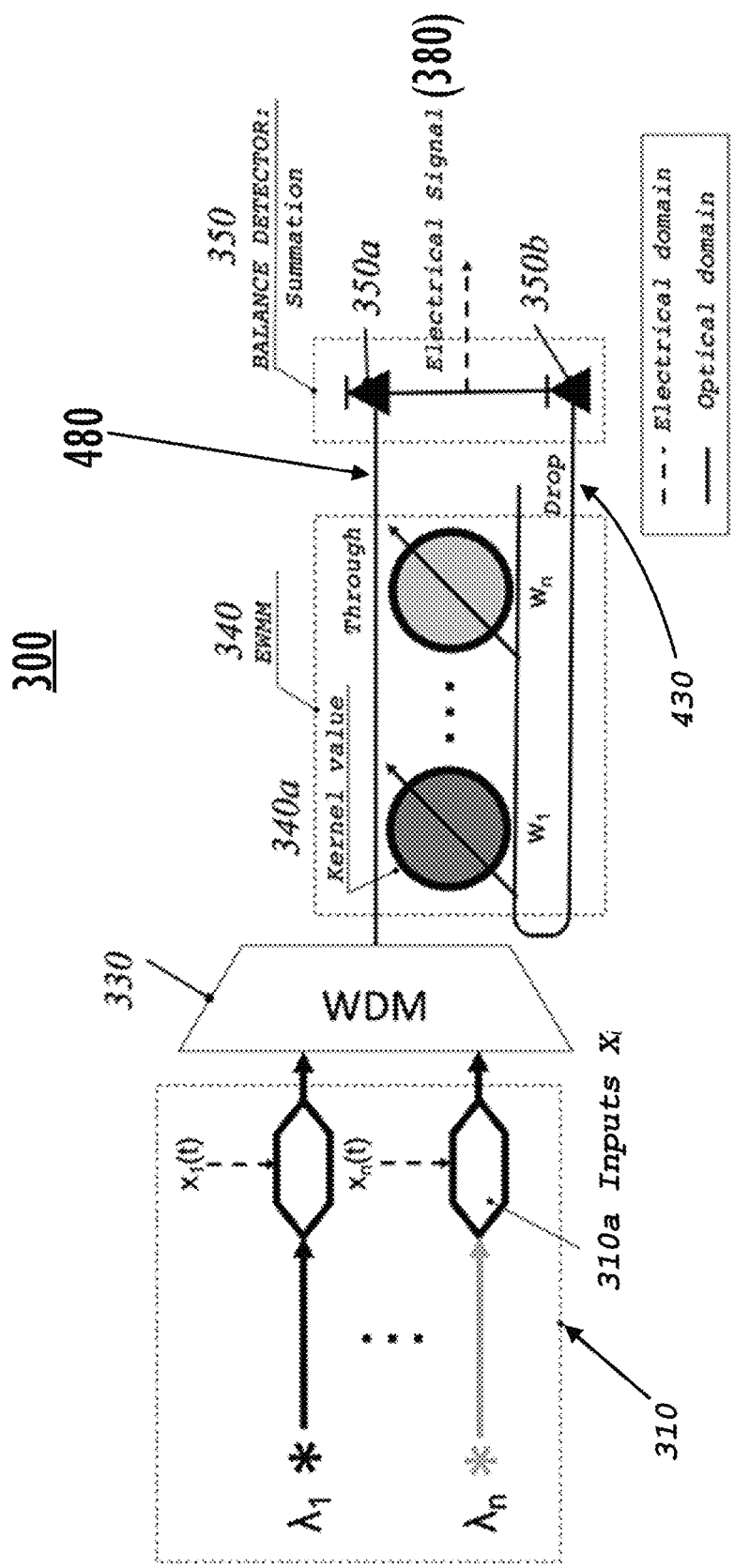
FIG. 3 illustrates a microring resonator neuron, in accordance with an example of this disclosure.

FIG. 3 illustrates a microring resonator (MRR) neuron 300. The MRR neuron 300 includes an EOM 310 coupled to a wavelength-division multiplexer 330. The wavelength-division multiplexer 330 is connected to an element-wise matrix multiplication (EWMM) circuit 340. The wavelength-division multiplexer 330 is configured to receive (laser) signals 310a having wavelengths $\lambda_1 \ldots \lambda_n$, (e.g., 120, 230). The EWMM circuit 340 contains a MRR 340a. The EWMM circuit 340 is connected to a balance detection summation circuit 350. In at least one example of this disclosure, the balance detection summation circuit 350 includes a first photodetector 350a and a second photodetector 350b. In at least one example of this disclosure, the first photodetector 350a is a photodiode and the second photodetector 350b is also a photodiode. In at least one example of this disclosure, MRR neuron 300 is a component of a photonic convolutional filter. In the MRR neuron 300 of the photonic convolutional filter, wavelength-division multiplexed input signals 310a (e.g., 120, 230) are weighted through tunable MRRs 340a. Weighted inputs 310a are later incoherently summed using balance detector summation circuit 350.

In at least one example of this disclosure, the MRR neuron 300 is used to perform two heuristic Winograd transformations (Winograd filters) on each wavelength $\lambda$. In at least one example, the MRR neuron 300 uses EWMM 340 circuit to perform EWMM on each wavelength $\lambda$ of light received. The MRR neuron 300 also uses MRR 340a to perform a weighting function. Each MRR 340a operates on a single wavelength $\lambda_1$. In practice and in effect, the MRR 340a functions as a tunable analog filter centered at $\lambda_1$, in which voltage applied to the EOM 310, (420) allows only a portion of light received to pass through waveguide 480, while the remainder of the light is dropped (430) by the MRR neuron 300. Modulation by the EOM 310 can be triggered by an analog electric field fed by a memristor (e.g., 470). In at least one example, a memristor can store the weights applied by the MRR neuron 300 in a 6-bit resolution.

In at least one example of this disclosure, when a bias voltage $V_1$ is applied to the EOM 310, the application of the bias voltage causes the transmission spectrum of the MRR 340a to have a resonant frequency $f_1$. When wavelength-division multiplexed light passes through the coupled waveguide 480, the component of that light having (matching) wavelength $\lambda_1$ is coupled into the MRR 340a. In at least one example, raising the bias voltage applied to EOM 310 causes the resonant frequency $f_1$ of the MRR 340a to shift due to the change in the effective refractive index of the MRR 340a. Thus, changes in applied voltage will cause changes in resonating frequencies. In one or more neural network accelerators of this disclosure, it is this ability to modulate resonating frequencies with changes in applied voltage which translates into pointwise multiplication. The products of the pointwise multiplication performed by the EWMM 340 pass to the balance detector summation circuit 350. As noted, the balance detector summation circuit 350 can include two photodiodes 350a, 350b. The balance detector summation circuit 350 integrates (determines integral sum of the values of) the various wavelengths of light that the balance detector summation circuit 350 receives through waveguide 480 and generates an electrical signal 380 corresponding to sum of the light beam power.

Figure 4:
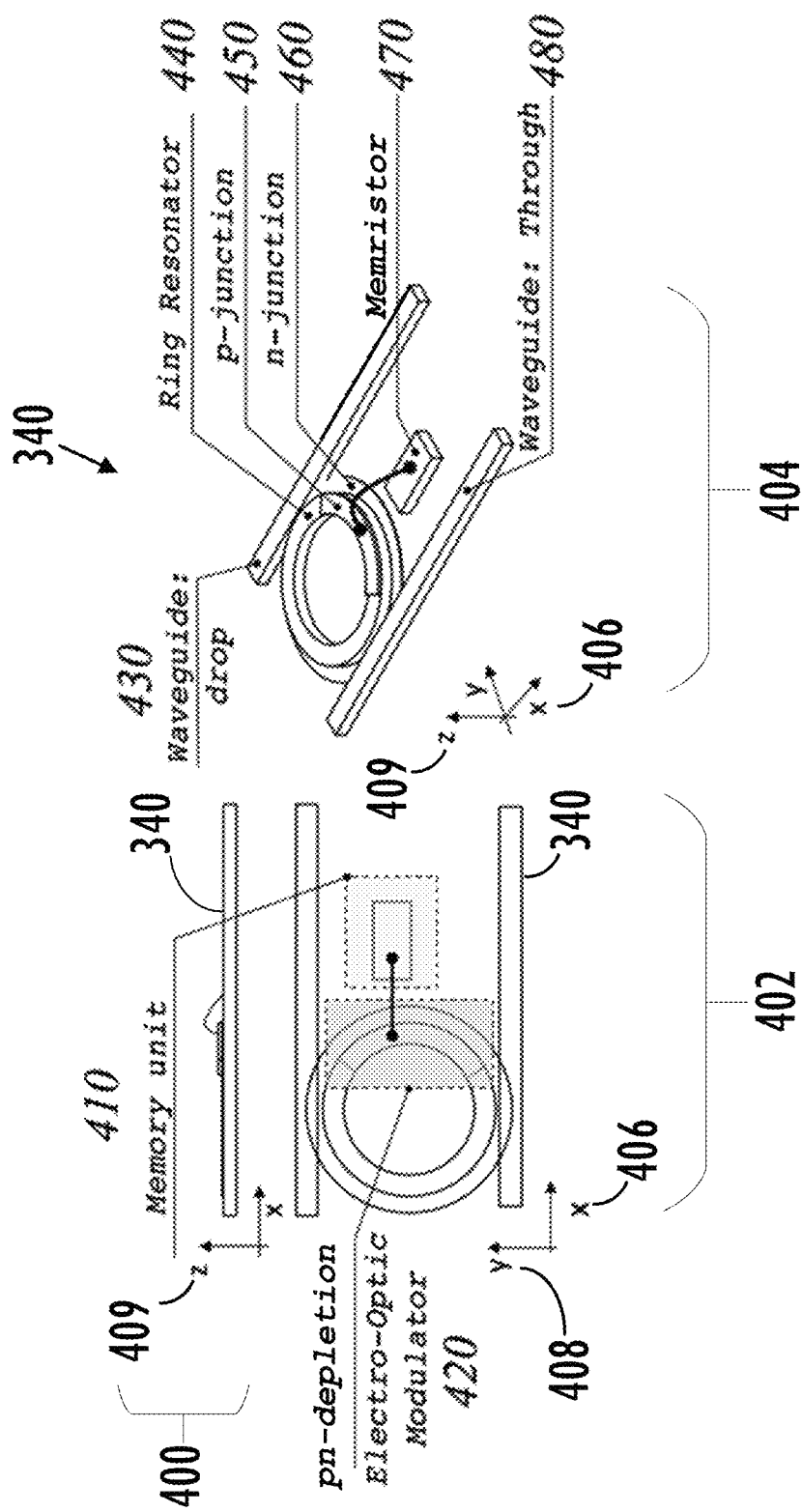
FIG. 4 illustrates an analog memristor-based memory unit integrated with a microring resonator neuron, in accordance with an example of this disclosure.

FIG. 4 illustrates a sideview 400, a plan view 402, and a perspective view 404 of an analog memristor-based memory unit 410 integrated with an MRR 440 (e.g., 340) used in the EWMM circuit 340. EWMM circuit 340 includes EOM 420 (e.g., 310). EWMM circuit 340 includes drop-waveguide 430. The MRR 440 is connected to memory 410. In at least one example of this disclosure, memory 410 is a memristor 470. The MRR 440 is connected to memory 410 (470) via p-junction 450. The MRR 440 is also connected to through-waveguide 480. The MMR 440 is connected to waveguide output 430 through n-junction 460.

In at least one example, EOM 420 (310) has a silicon-based p-i-n junction that is side coupled to a wave guide (e.g., 480) or to a p-n junction (e.g., 450, 460). In one or more examples, the maximum allowed optical power flowing in each physical channel of a photonic accelerator (PA) (500) is bound by the optical power that would produce non-linearities in the silicon waveguides (e.g., 480) and the minimum power that a photo-detector (not shown) can distinguish from noise is when the signal-to-noise ratio of the PA (500) is unity (SNR=1).

In accordance with an example of this disclosure, the speed of a largely optically-based portion (e.g., 504) of an accelerator (e.g., 500), is given by the total number of MRRs 340a, 440 and their pitch.

Winograd Transform for Convolution

In two-dimensional convolution, a single output component of the convolution is calculated by:

$$y_{n,p,k,q} = \sum_{n=1}^{c} \sum_{x=1}^{r} \sum_{y=1}^{r} x_{n,c,p+x,q+y} \times w_{k,c,x,y}$$

Multiplication in the above equation is repeated for all output convolution components. In a brute-force convolution the total number of multiplications required to perform a full convolution is equal to $$(m \times r)^2$$

where m is the size of the output 240 feature map channel and r is the size of the filter. However, by applying the Winograd transform the total number of multiplications reduces to $$\frac{(m \times r)^2}{(m + r - 1)^2}$$

In a PA (500) of this disclosure, multiplication operations are carried out by MRRs 340a, 440. Thus, one technical benefit of applying the Winograd transform is that the number of MRRs 340a, 440 required is minimized.

In one or more examples of this disclosure, a PA (500) processes one layer 200 of a CNN at a time. This single-layer processing is a consequence of the fact that for a given CNN, different tiles of output feature maps 240 are computed sequentially, and thus arrive at the PA (500) at different times. However, to initiate processing of the next layer 200, all the inputs 120, 230 from the previous layer 200 must be available and synchronized. In at least one example of this disclosure, single-layer processing enforces the required synchronization.

In accordance with at least one example of this disclosure, at the input 120, 230 of a PA (500), an input tile of shape n×n×c and filters 110 of size r×r×c are transformed into the Winograd domain. The transforms of the input tiles and the transforms of the filters 110 are then multiplied element by element. The products of each such element by element multiplication are regularized using an inverse Winograd transform. The regularized signals are digitized using an array of analog to digital convertors (570) and placed into output line buffers (510b) to be stored back in memory (e.g., 580).

Figure 5:
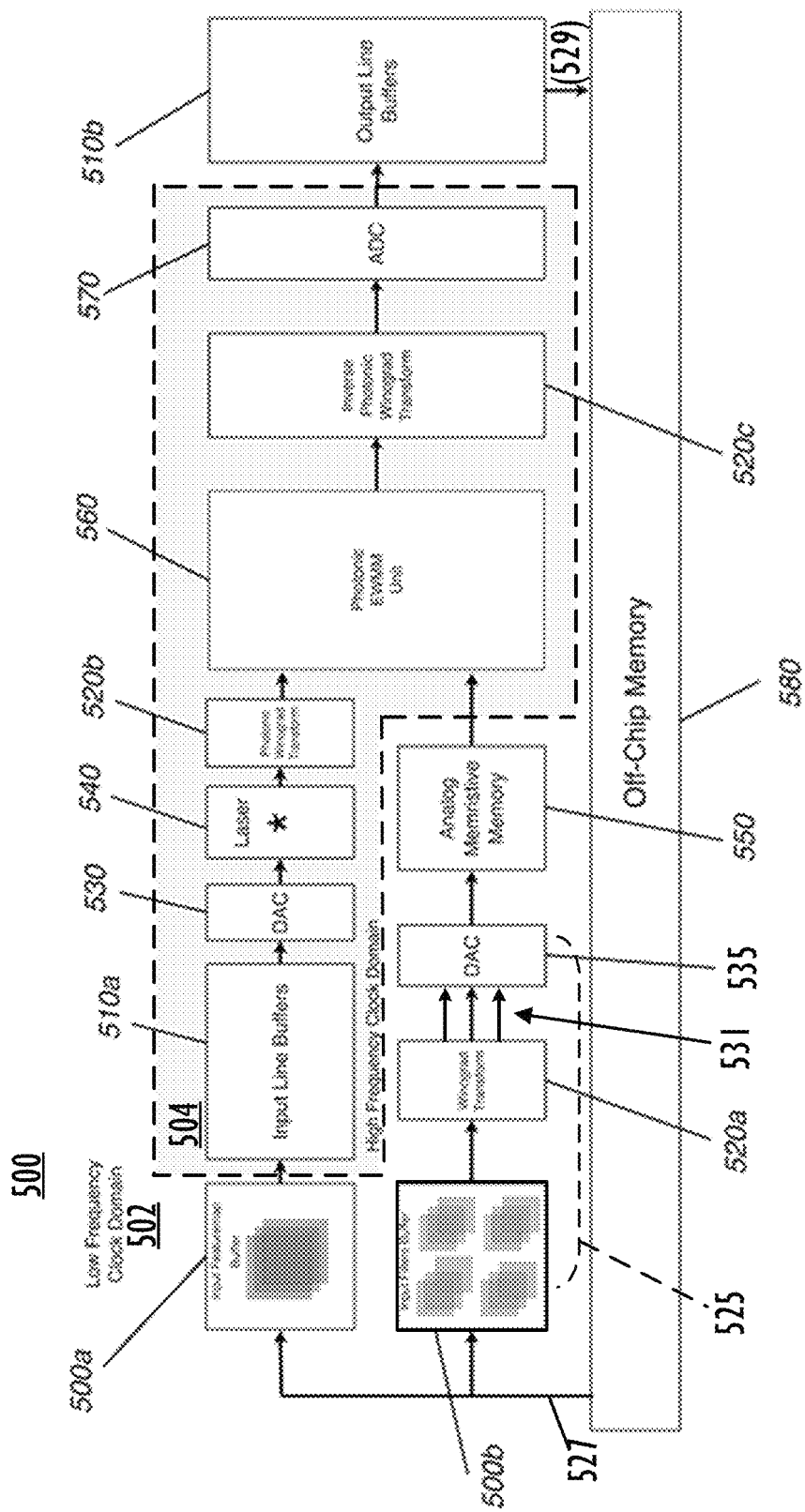
FIG. 5 illustrates a photonic accelerator, in accordance with an example of this disclosure.

FIG. 5 illustrates a photonic accelerator (PA) 500, in accordance with an example of this disclosure. In the example of FIG. 5, although components are illustrated as individual blocks in order ease understanding, most components designate multiple instances of such components. Some components 502 of the PA 500 operate in a low frequency clock domain, whereas other components 504 operate in a high frequency clock domain (e.g., 5 GHz), meaning that the timing of one grouping of components 504 is timed by a clock (not shown) which has a higher operating frequency (e.g., 5 GHz) than another clock (not shown) which controls the timing of the other grouping of components 502. The high-speed clock domain accommodates low latency components 504 of the PA 500, including the photonic components. The remaining components 502 of the PA 500 run according to the timing of the slower clock (not shown). As shown in FIG. 5, the PA 500 can include an input feature map buffer 500a which is connected to an input line buffer 510a. The input line buffer 510a is connected to a (high frequency) digital-to-analog converter (DAC) 530. The DAC 530 is connected to a coherent light source 540. The coherent light source 540 is connected to a Winograd transform circuit 520b. The Winograd transform circuit 520b is connected to an EWMM circuit 560, (e.g., 340) The EWMM circuit 560 is connected to an inverse Winograd transform circuit 520c. The inverse Winograd transform circuit 520c is connected to an analog-to-digital convertor (ADC) 570. The ADC 570 is connected to an output line buffer 510b. The output line buffer 510b is connected to Memory 580.

The PA 500 can also include input weights buffer 500b. The input weights buffer 500b is connected to a Winograd transform circuit 520a. The Winograd transform circuit 520a is connected to a (lower frequency) DAC 535. The DAC 535 is connected to an analog memory 550 (e.g., 410, 470). The analog memory 550 is connected to the EWMM circuit 560. In at least one example of this disclosure, the analog memory 550 comprises a memristor.

The input line buffer, the DAC 530, the coherent light source 540, the Winograd transform circuit 520b, inverse Winograd transform circuit 520c, and ADC 570 operate in a high frequency clock domain and can therefore be termed high frequency components 504.

The input feature map buffer 500a, the input weights buffer 500b, the Winograd transform circuit 520a, the DAC 535, the analog memory 550, and the memory 580 operate in the low frequency clock domain and can therefore be termed lower frequency components 502. Input feature map buffer 500a and input weights buffer 500b are configured to receive data from memory 580. Output line buffer 510b is configured to output data to memory 580. In at least one example of this disclosure, all components of the PA 500 reside on a single chip. In at least one example of this disclosure, at least some of the components of the PA 500 reside on a system on chip. In at least one example of this disclosure, memory 580 does not reside on the chip.

As noted, the PA 500 runs on two clock domains, meaning that the timing of one grouping of components 504 is timed by a clock (not shown) which has a higher operating frequency than another clock (not shown) which controls the timing of the other grouping of components 502. The high-speed clock domain accommodates low latency (faster) components 504 of the PA 500, including the photonic components. The remaining components 502 of the PA 500 run off of the slower clock (not shown). The filter buffers 500b, the filter Winograd transform circuit 520a, and the (lower frequency) DAC 535 form a filter path 525. The filter buffers 500b, the filter path Winograd circuit 520a, and the filter path DAC 535 run on a slower clock domain because there is no time-sensitivity on filter path 525. Feature map buffers 500a also run on the slower clock domain. Data transfers 527 from memory 580 to the input feature map buffers 500a and data transfers 527 from memory 580 to input filters buffer 500b are not time-sensitive. Data transfers 529 from the output line buffers 510b to memory 580 are also not time-sensitive.

The PA 500 illustrated includes an EWMM circuit 560 (e.g., 340). The EWMM circuit 560 is photonically implemented using a photonic neuron (e.g., 300). In at least one example, input feature maps 200 and filters 110 are stored in off-chip memory (e.g., 580). In at least one example, the PA 500 applies the Winograd transform to the input feature maps 200 (of the input feature maps buffer 500a) and filters 110 (of the input filters buffer 500b). In one or more examples, while input feature maps 200 will change for different tiles of inputs 120, 230, the filters 110 are fixed for each layer 200. The photonic Winograd transform circuit 520b applies the Winograd transform to the input feature maps 200 (of the input feature maps buffer 500a). The digital Winograd transform circuit 520a applies the Winograd transform to the filters 110 (of the input filters buffer 500b). The transformed filters and transformed input feature map tiles are converted into analog signals by DAC 535 and DAC 530, respectively. The analog signals are used to modulate the laser beams from laser 540. During processing of a given layer 200, the corresponding filters 110 are fixed. To keep the corresponding filters 110 fixed during processing of a given layer 200, analog signals constituting the filters 110 are maintained throughout that processing. In at least one example of this disclosure, the PA 500 uses the non-volatile analog memristive memory 550 to maintain the signal input voltages in their analog form.

In accordance with an example of this disclosure, a tile is processed in each iteration of a Winograd convolution. To process an entire feature map 200, a transformed filter tile moves across the entire feature map 200. That being the case, in at least one example of the PA 500, a transformed filter tile will be reused for a given feature map 200, thereby obviating the need to query memory 580 each time the transformed filter is applied to the feature map 200. In an example, input 120, 230 tiles are fetched from memory 580 and loaded into the line buffer, thereby minimizing redundant queries to memory 580. Buffered tiles are transformed by Winograd transform circuit 520a and are then passed into the DAC 535 using parallel channels 531. The transformed filter weights are converted by DAC 530 into analog signals which the PA 500 uses to program the analog memristive memory 550. In at least one example, voltages generated using the stored analog signals of the memristive memory 550 to modulate the laser source 540 for the filters 110. In accordance with at least one example of this disclosure, each signal generated by DAC 530 and DAC 535 are used to modulate a laser beam generated by laser source 540 of a specific wavelength λ. For each set of filters 110 modulated by the laser source 540, each line of the input line buffer 510a goes through multiple iterations, with each iteration corresponding to a different input tile 120, 230. In at least one example, both the input tile laser beam and the filter laser beam are ready, the EWMM circuit 560 multiplies each element of the Winograd input feature map 200 tile by each element's corresponding Winograd filter value. The output from EWMM circuit 560 must be transformed out of the Winograd domain into the original domain by the inverse Winograd transform circuit 520. The inverse transformed output from the Winograd transform circuit 520 contains feature map 200 tiles for multiple channels c (filter 110 dimensions). In one or more examples of this disclosure, the values of the feature map 200 tiles from the Winograd transform circuit 520 are digitized using the ADC 570, buffered in the output line buffer 510b, and stored in memory 580.

Figure 6:
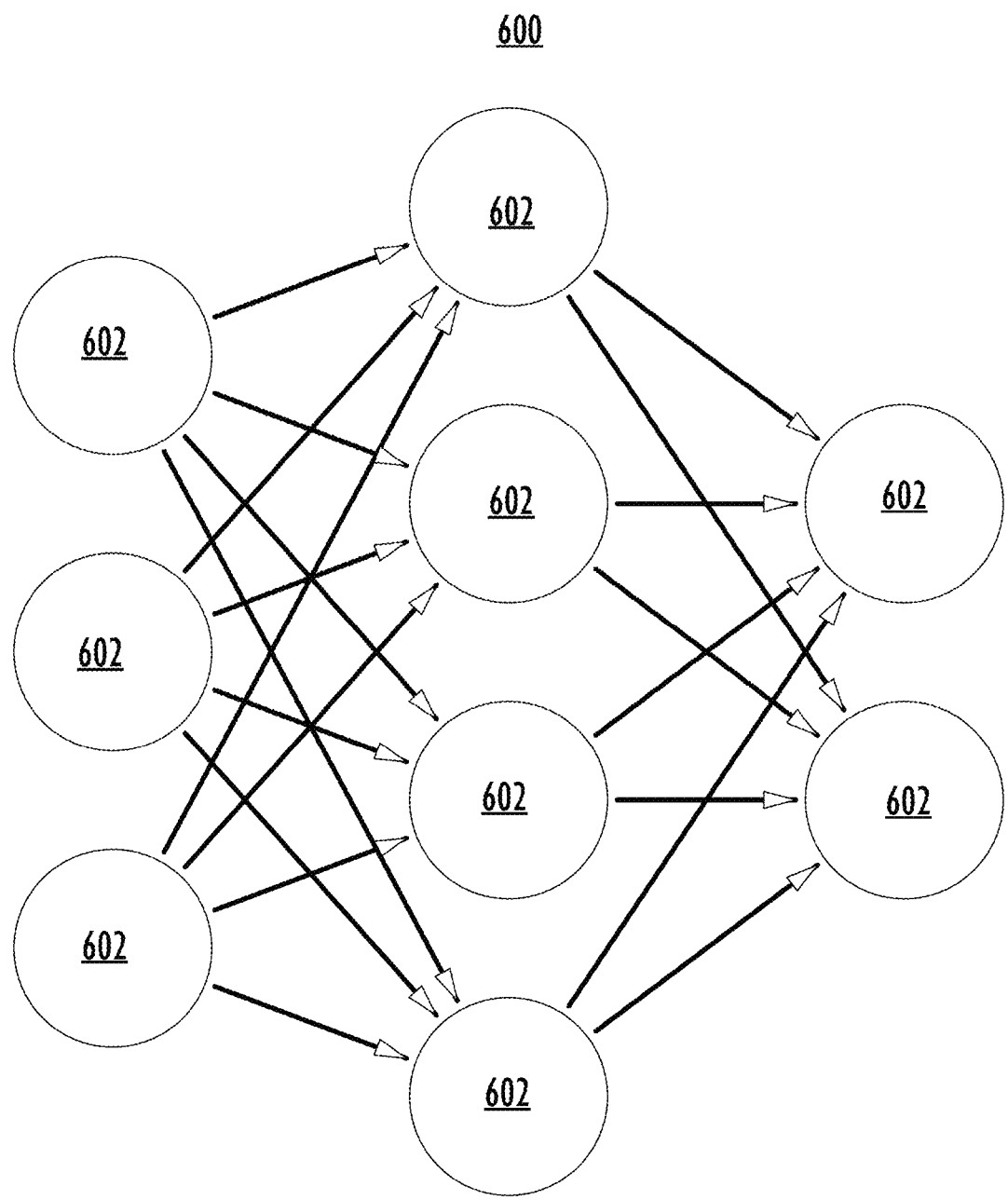
FIG. 6 illustrates a convolutional neural network, in accordance with an example of this disclosure.

FIG. 6 shows a CNN 600 in accordance with an example of this disclosure. CNN 600 is an interconnected group of nodes 602. Each circular node 602 represents an artificial neuron (e.g., 300) and an arrow represents a connection from the output of one artificial neuron (e.g., 300) to the input of another.

Figure 7:
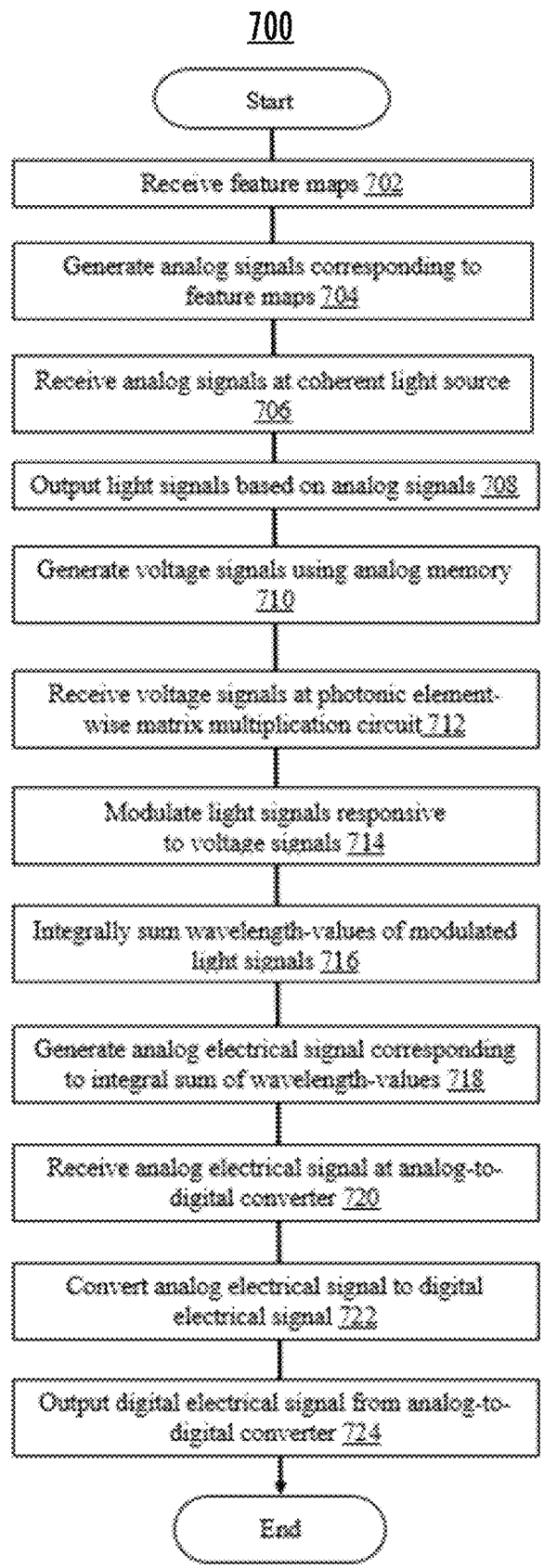
FIG. 7 illustrates a method for accelerating computations of a convolutional neural network, in accordance with an example of this disclosure.

Referring to FIG. 7, an illustrative, non-limiting example of a method 700 (e.g., 100) for accelerating computations for a CNN (e.g., 600) is shown. The method 700 comprises receiving 702 one or more feature maps (e.g., 200) at an input buffer (e.g., 500a) and generating 704 one or more analog signals (e.g., 310a) corresponding to the one or more feature maps (e.g., 200), using a digital-to-analog converter (e.g., 540) coupled to the input buffer (e.g., 500a). The method 700 also comprises receiving 706 the one or more analog signals (e.g., 310a) from the digital-to-analog converter (e.g., 540) at a coherent light source (e.g., 540) which is coupled to the digital-to-analog converter (e.g., 540), and then outputting 708 one or more light signals based, at least in part, on the one or more analog signals (e.g., 310a), using the digital-to-analog converter (e.g., 540). Thereafter, the method 700 comprises generating 710 one or more voltage signals using an analog memory (e.g., 550) and receiving 712, at a photonic element-wise matrix multiplication circuit (e.g., 340), the one or more voltage signals from the analog memory (e.g., 540). As shown in FIG. 7, the method 700 further includes modulating 714 the one or more light signals responsive to the one or more voltage signals, using the photonic element-wise matrix multiplication circuit (e.g., 340). (The one or more light signals correspond to one or more wavelength-values.) The method 700 also include integrally summing 716 the one or more wavelength-values of the one or more light signals using the photonic element-wise matrix multiplication circuit (e.g., 340) and generating 718 an analog electrical signal corresponding to the one or more integrated light signals. The method 700 further comprises: receiving 720 the analog electrical signal at an analog-to-digital converter (e.g., 570); converting 722 the analog electrical signal to a digital electrical signal using the analog electrical signal at an analog-to-digital converter (e.g., 570); and outputting 724 the digital electrical signal from the analog-to-digital converter (e.g., 570). In at least one example of the method 700, the one or more voltage signals correspond to one or more analog Winograd domain filter signals.

Figure 8:
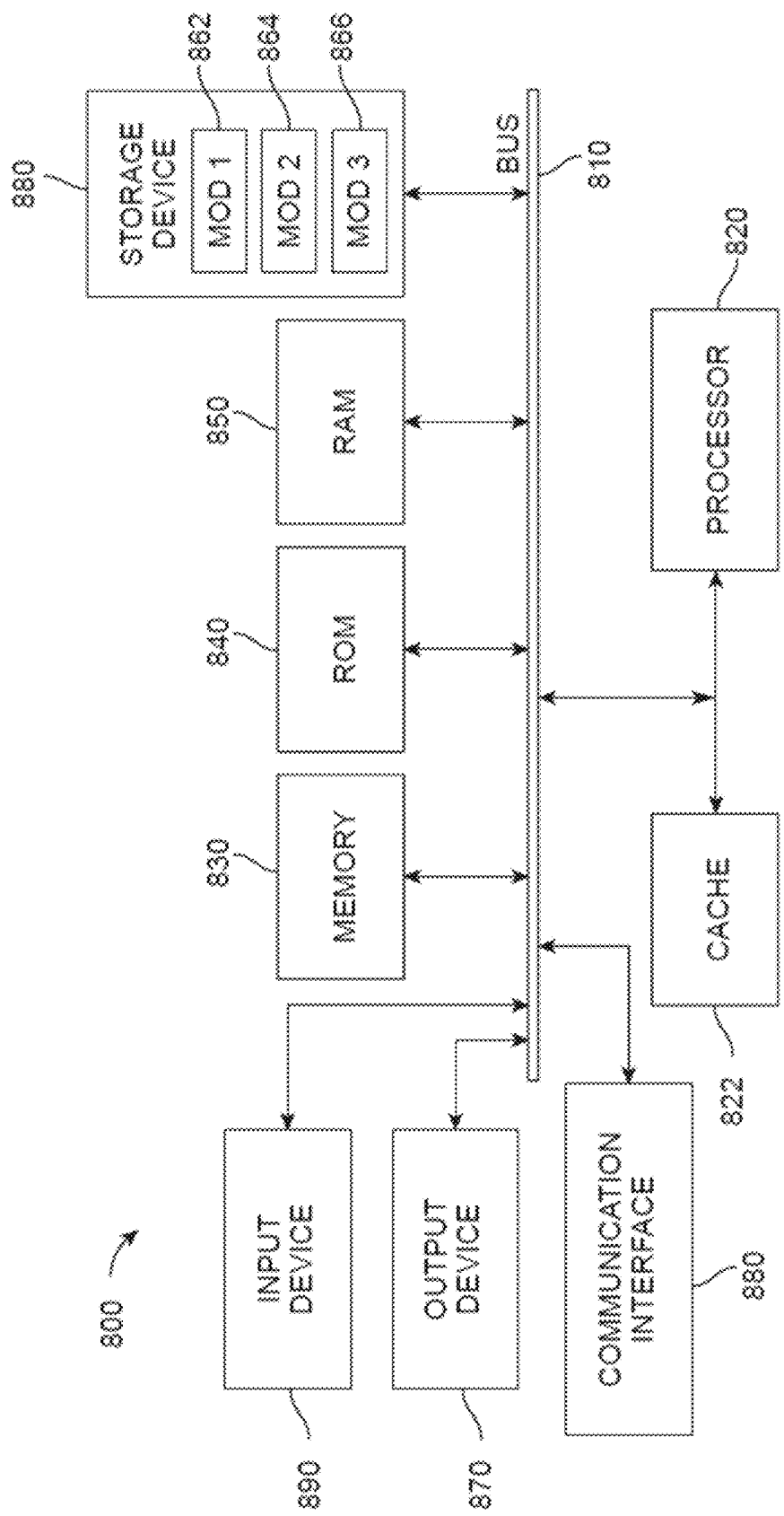
FIG. 8 illustrates an electronic device which can be employed to methods of this disclosure.

FIG. 8 illustrates an electronic device 800 which can be employed to practice the concepts and methods (e.g., 100, 700) described above. The components disclosed herein can be incorporated in whole or in part into tablet computers, personal computers, handsets and other devices utilizing one or more microphones. As shown, device 800 includes processor(s) 820 and a system bus 810. Processor 820 can include one or more digital signal processors (DSP) and/one or more graphics processing units (GPU). System bus 810 interconnects various system components—including the system memory 830 (e.g., 580) such as read only memory (ROM) 840 and random-access memory (RAM) 850—to the processor 820. The device 800 can include a cache 822 of high-speed memory connected directly with, near, or integrated as part of the processor 820. The device 800 copies data from the memory 830 and/or the storage device 860 to the cache 822 for quick access by the processor 820. In this way, the cache provides a performance boost that avoids processor 820 delays while waiting for data. These and other modules can control or be configured to control the processor 820 to perform various actions. Other system memory 830 may be available for use as well. The memory 830 (e.g., 550) can include multiple different types of memory with different performance characteristics. The processor 820 can include any general-purpose processor and a hardware module or software module, such as module 1 (862), module 2 (864), and module 3 (866) stored in storage device 860, configured to control the processor 820 as well as a special-purpose processor where software instructions are incorporated into the actual processor 820 design. The processor 820 may essentially be a completely self-contained computing system, containing multiple cores or processors, a bus, memory controller, cache, etc. A multi-core processor 820 may be symmetric or asymmetric.

The system bus 810 may be any of several types of bus structures including a memory bus or memory controller, a peripheral bus, and a local bus using any of a variety of bus architectures. A basic input/output system (BIOS) stored in ROM 840 or the like, may provide the basic routine that helps to transfer information between elements within the device 800, such as during start-up. The device 800 further includes storage devices 860 such as a hard disk drive, a magnetic disk drive, an optical disk drive, tape drive or the like. The storage device 860 can include software modules 862, 864, 866 for controlling the processor 820. Other hardware or software modules are contemplated. The storage device 860 is connected to the system bus 810 by a drive interface. The drives and the associated computer readable storage media provide nonvolatile storage of computer readable instructions, data structures, program modules and other data for the device 800. In at least one example, a hardware module that performs a function includes the software component stored in a non-transitory computer-readable medium coupled to the hardware components—such as the processor 820, bus 810, output device 870, and so forth—necessary to carry out the function.

For clarity of explanation, the device of FIG. 8 is presented as including individual functional blocks including functional blocks labeled as a "processor" (e.g., 820). The functions these blocks represent may be provided using either shared or dedicated hardware, including, but not limited to, hardware capable of executing software and hardware, such as a processor 820, that is purpose-built to operate as an equivalent to software executing on a general-purpose processor. For example, the functions of one or more processors presented in FIG. 8 may be provided by a single shared processor or multiple processors. (Use of the term "processor" should not be construed to refer exclusively to hardware capable of executing software.) One or more examples of this disclosure include microprocessor hardware, and/or digital signal processor (DSP) hardware, read-only memory (ROM) 840 for storing software performing the operations discussed in one or more examples below, and random-access memory (RAM) 850 for storing results. Very large-scale integration (VLSI) hardware components, as well as custom VLSI circuitry in combination with a general-purpose DSP circuit (833, 835), can also be used.

Figure 9:
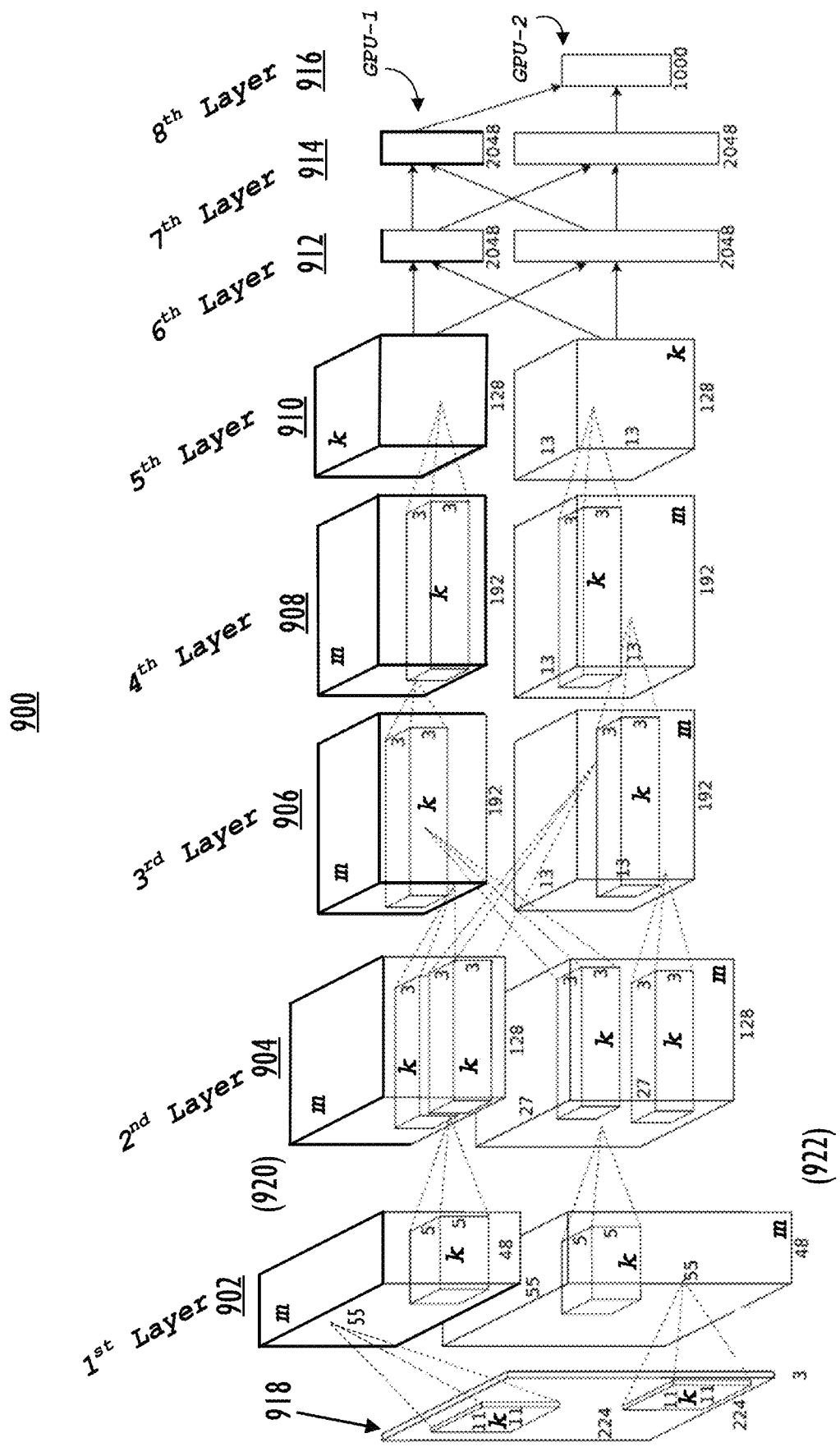
FIG. 9 illustrates an architecture of a convolutional neural network, in accordance with an example of this disclosure.

FIG. 9 illustrates a CNN 900, in accordance with an example of this disclosure. As depicted shown in FIG. 9, the CNN 900 contains eight layers (e.g., 200); the first five layers 902, 904, 906, 908, 910 are convolutional and the remaining three layers 912, 914, 916 are fully connected. The output of the last fully-connected layer 916 is fed to a 1000-way softmax function running on a processor (e.g., 820). The kernels (k) (e.g., 110, 210) of the second layer 904, the fourth layer 908, and the fifth layer 910 are connected only to those kernel maps (in) in the previous layer 902, 906, 908 which reside on the same GPU. The kernels of the third layer 906 are connected to all kernel maps in the second layer 904. The neurons (e.g., 300, 602) of the fully connected layers 912, 914, 916 are connected to all neurons (e.g., 300, 602) in the previous layer 910, 912, 914.

In the example shown in FIG. 9, the first convolutional layer 902 filters a 224×224×3 input image 918 with 96 kernels of size 11×11×3. The second convolutional layer 904 takes as input the (response-normalized and pooled) output of the first convolutional layer 902 and filters it with 256 kernels of size 5×5×48. The third 906, fourth 908, and fifth convolutional layers 910 are connected to one another without any intervening pooling or normalization layers. The third convolutional layer 906 has 384 kernels of size 3×3×256 connected to the (normalized, pooled) outputs of the second convolutional layer 904. The fourth convolutional layer 908 has 384 kernels of size 3×3×192, and the fifth convolutional layer 910 has 256 kernels of size 3×3×192. Fully-connected layer 912 and fully-connected layer 914 have 4096 neurons (e.g., 300, 602) each. One GPU (e.g., 820) runs the layer-parts in the upper row 920 while the other GPU (e.g., 820) runs the layer-parts in the lower row 922. The GPUs communicate with each other only at certain layers. The input 918 (e.g., 120, 230) of CNN 900 is has 150,528 dimensions, and the number of neurons (e.g., 300, 602) in the remaining layers of the CNN 900 is 253,440 (902), 186,624 (904), 64,896 (906), 64,896 (908), 43,264 (910), 4096 (912), 4096 (914), and 1000 (916).

In at least one example of this disclosure, a photonic CNN accelerator (e.g., 500) can process the convolutional layers 902, 904, 906, 908, 910, one at a time. Each convolutional layer 902, 904, 906, 908, 910 consists of inputs (e.g., 110, 230) and kernels (k) (e.g., 110, 210). The output of a CNN layer 902, 904, 906, 908, 910 forms the input (e.g., 110, 230) of the next CNN layer 902, 904, 906, 908, 910. Kernel values are initially stored in an off-chip memory (e.g., 580), then loaded into an input weights buffer (e.g., 500*b*), transformed using a Winograd Transform (e.g., 520*a*), converted to analog signals by a digital-to-analog converter (e.g., 535), stored in an analog memristive memory (e.g., 550, 410), and finally constitute the first input (e.g., 110, 230) of a photonic EWMM circuit (e.g., 560, 340). Input values are initially stored in the off-chip memory (e.g., 580), then loaded into an input feature map buffer (e.g., 500*a*), fed into input line buffers (e.g., 510*a*), converted to analog signals by a digital-to-analog converter (e.g., 530), activate laser beams (e.g., 540), are transformed using photonic the Winograd Transform (e.g., 520*b*), and finally constitute the second input (e.g., 110, 230) of the photonic EWMM unit 560. Within the photonic EWMM unit (e.g., 340, 560) transformed kernels and transformed inputs on multiple wavelengths are element-wise multiplied using a wavelength-division multiplexer (e.g., 330). Multiplication results are summed up through a balanced detector (e.g., 350) and results in an electrical signal (e.g., 380). The electrical signal (e.g., 380) is transformed back by an inverse photonic Winograd Transform circuit (e.g., 520*c*) and converted to a digital signal using an analog-to-digital converter (e.g., 570). Outputs (e.g., 240) from the analog-to-digital converter (e.g., 570) are placed in output line buffers (e.g., 510*b*) and stored backed to off-chip memory (e.g., 580). Such output values (e.g., 240) from a first layer (e.g., 902) constitute the inputs (e.g., 120, 230) for the next layer (e.g., 904). The process described above is performed for all five convolutional layers 902, 904, 906, 908, 910.

The figures (including for instance FIGS. 7-9) are non-limiting illustrative examples of the invention, and other suitable methods and systems will be recognized as being within the spirit and scope of the invention. The examples described above are provided by way of illustration only and should not be construed to limit the scope of the disclosure. Various modifications and changes can be made to the principles and examples described herein without departing from the scope of the disclosure and without departing from the claims which follow.

The invention claimed is:

1. A neural network, the neural network including a system on chip, wherein the system on chip comprises:
   a coherent light source configured to receive one or more analog signals and output one or more light signals based, at least in part, on the one or more analog signals;
   an analog memory configured to generate one or more voltage signals;
   a photonic element-wise matrix multiplication circuit coupled to the coherent light source and the analog memory, wherein the photonic element-wise matrix multiplication circuit configured to:
      receive the one or more voltage signals from the analog memory and modulate the one or more light signals responsive to the one or more voltage signals; and
   generate an analog electrical signal based, at least in part, on the modulated light signals,
   wherein the one or more voltage signals correspond to one or more filter signals.

2. The neural network of claim 1, further comprising a photonic inverse-Winograd transform circuit, wherein:
   the photonic element-wise matrix multiplication circuit is further configured to transform the one or more light signals into a Winograd domain;
   the one or more filter signals are analog Winograd domain filter signals; and
   the photonic inverse-Winograd transform circuit is configured to remove the one or more light signals from the Winograd domain.

3. The neural network of claim 2, wherein the system on chip further comprises:
a filter buffer configured to receive a plurality of filters;
a Winograd transform circuit configured to transform the plurality of filters into digital-Winograd domain filter signals; and
a digital-to-analog converter coupled to the analog memory and configured to convert the digital-Winograd domain filter signals into the analog Winograd domain filter signals,
wherein the analog memory is configured to detect the analog Winograd domain filter signals and generate the voltage signals in response thereto.

4. The neural network of claim 3, wherein the analog memory comprises a memristor.

5. The neural network of claim 3, wherein a timing of the digital-to-analog converter is controlled by a clock.

6. A method for accelerating computations for a convolutional neural network, comprising:
receiving, at a coherent light source, one or more analog signals;
outputting one or more light signals based, at least in part, on the one or more analog signals;
generating, using an analog memory, one or more voltage signals;
receiving, at a photonic element-wise matrix multiplication circuit, the one or more voltage signals from the analog memory;
modulating, using the photonic element-wise matrix multiplication circuit, the one or more light signals responsive to the one or more voltage signals, wherein the one or more light signals corresponding to one or more wavelength-values;
integrally summing, using the photonic element-wise matrix multiplication circuit, the one or more wavelength-values of the one or more light signals; and
generating, using the photonic element-wise matrix multiplication circuit, an analog electrical signal corresponding to the one or more light signals so integrated; and
wherein the one or more voltage signals correspond to one or more analog Winograd domain filter signals.

7. The method for accelerating computations for a convolutional neural network of claim 6, further comprising:
transforming, using the photonic element-wise matrix multiplication circuit, the one or more light signals into a Winograd domain; and
removing, using a photonic inverse-Winograd transform circuit, the one or more light signals from the Winograd domain.

8. A photonic accelerator for a convolutional neural network, comprising:
a coherent light source configured to receive one or more analog signals and output one or more light signals based, at least in part, on the one or more analog signals;
an analog memory configured to generate one or more voltage signals;
a photonic element-wise matrix multiplication circuit comprising a plurality of microring resonators and a photosensitive balanced detector summation circuit and being coupled to the coherent light source and the analog memory, wherein the photonic element-wise matrix multiplication circuit configured to:
receive the one or more voltage signals from the analog memory;
modulate the one or more light signals responsive to the one or more voltage signals, the modulated light signals having one or more wavelengths having one or more wavelength-values;
perform integration on the one or more wavelength-values of the modulated light signals; and
generate an analog electrical signal corresponding to the integrated one or more wavelength-values of the modulated light signals;
wherein the one or more voltage signals correspond to one or more filter signals.

9. The photonic accelerator of claim 8, further comprising a photonic inverse-Winograd transform circuit, wherein:
the photonic element-wise matrix multiplication circuit is further configured to transform the one or more light signals into a Winograd domain;
the one or more filter signals are analog Winograd domain filter signals; and
the photonic inverse-Winograd transform circuit is configured to remove the one or more light signals from the Winograd domain.

10. The photonic accelerator of claim 9, wherein the analog memory comprises a memristor.

11. The photonic accelerator of claim 10, wherein the photonic element-wise matrix multiplication circuit is further configured to:
receive the one or more voltage signals from the analog memory and modulate the one or more light signals responsive to the one or more voltage signals using the plurality of microring resonators;
and integrate the one or more light signals so modulated using the photosensitive balanced detector summation circuit.

* * * * *